H. J. BRIELMAIER.
ICE CREAM FREEZER.
APPLICATION FILED SEPT. 20, 1913.
1,114,104.
Patented Oct. 20, 1914.
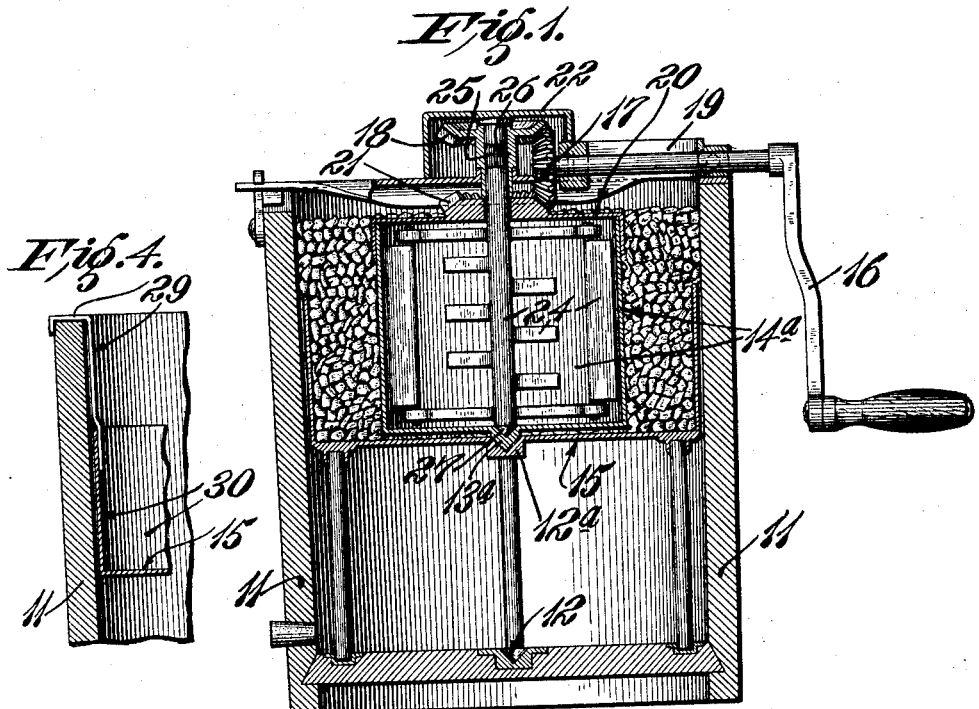
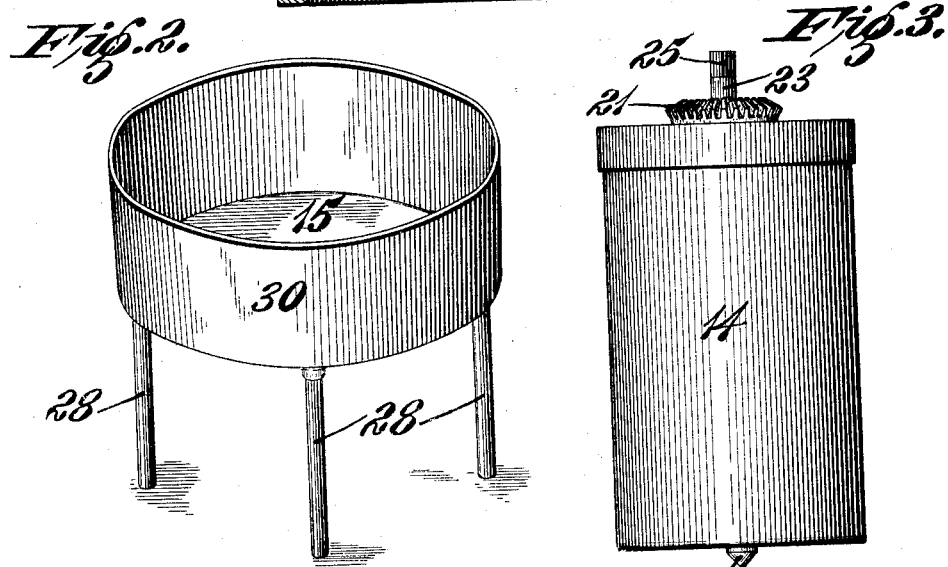
Witnesses:
Edgar T. Farmer.
A.M. Holcombe.
Inventor
Herman J. Brielmaier,
By Carr & Carr,
his Attys.

UNITED STATES PATENT OFFICE.

HERMAN J. BRIELMAIER, OF ST. LOUIS, MISSOURI.

ICE-CREAM FREEZER.

1,114,104.

Specification of Letters Patent. Patented Oct. 20, 1914.

Application filed September 20, 1913. Serial No. 790,834.

*To all whom it may concern:*

Be it known that I, HERMAN J. BRIELMAIER, a citizen of the United States, and a resident of the city of St. Louis and State of Missouri, have invented a new and useful Improvement in Ice-Cream Freezers, of which the following is a specification.

This invention relates to ice cream freezers of the type generally used by families, comprising a tub within which is arranged a receptacle for the ice cream, with a space between the two for the ice and salt mixture.

The object of the invention is an attachment or extra fitting for ice cream freezers, whereby a smaller quantity of ice cream than the rated capacity of the freezer can be made without the use of an undue amount of ice.

A further object of the invention is to reduce the labor of freezing a small quantity of ice cream in a large freezer, and to take care of the surplus salt water from the melted ice.

Other objects of the invention appear in connection with the following description of the device illustrated in the accompanying drawing.

In the drawing, in which like characters of reference are used to designate the same parts in the several views—Figure 1 is a central vertical section of an ice cream freezer fitted with this invention; Fig. 2 is a perspective view of the false bottom for the freezer tub forming part of this invention; Fig. 3 is a side elevation of a full size ice cream receptacle adapted for use with the tub shown in Fig. 1; and Fig. 4 is a partial view in section of a modified false bottom.

Referring to the drawings, the tub 11 is fitted with a bottom bearing 12 for the bottom pivot 13 of a regular size ice cream can 14. There is also provided a false bottom 15 with a similar bearing 12ª for the bottom pivot 13ª of the small can 14ª. A crank 16 and bevel driving gears 17, 18, for rotating the can and dasher, are carried on the frame 19 removably secured across the top of the tub. Both the large can 14 and the small can 14ª have a cover 20 provided with a bevel gear 21 adapted to mesh with the driving gear 17. The driving gears are inclosed in a casing 22 carried by the frame 19. The dasher 24 for the small can and dasher 23 for the large can pass through holes in the covers 20 and have squared upper ends 25 adapted to fit in the square socket 26 of the gear 18. The lower ends of the dashers are pivotally mounted in bearings 27 in the bottoms of the cans.

The false bottom may be supported on legs 28 from the bottom of the tub, or it may be supported by being suspended from the upper edge of the tub by means of hooks 29. The false bottom has a side wall 30 to retain the ice and salt water mixture during the freezing operation. The superfluous water will overflow the side wall and be caught in the bottom of the tub, thus eliminating the necessity of draining the surplus water into a separate receptacle as in ordinary ice cream freezers.

It is evident that the invention can be applied to any usual type of family ice cream freezer with slight modifications.

What I claim as my invention is as follows:

1. In combination with an ice cream freezer tub and crank operating gear, a false bottom for said tub coöperating therewith to retain ice, means independent of said crank operating gear for supporting said false bottom above the bottom of said tub and for preventing it from rotating with respect thereto, and a short ice cream can journaled for rotation on said false bottom and coöperating with said operating gear.

2. In combination with an ice cream freezer tub and crank operating gear, a false bottom for said tub, means independent of said crank operating gear for supporting said false bottom above the bottom of said tub, and a short ice cream can journaled for rotation on said false bottom and coöperating with said operating gear, said false bottom having a side wall terminating below the top of said can for retaining the ice and salt water mixture at a fixed level.

Signed at St. Louis, Mo., this 17th day of September, 1913.

HERMAN J. BRIELMAIER.

Witnesses:
A. M. HOLCOMBE,
M. A. SHELTON.